United States Patent
Kraewer et al.

(10) Patent No.: US 11,473,476 B2
(45) Date of Patent: Oct. 18, 2022

(54) METHOD FOR DIAGNOSING A PLURALITY OF LAMBDA SENSORS

(71) Applicant: Robert Bosch GmbH, Stuttgart (DE)

(72) Inventors: Bernd Kraewer, Winnenden (DE); Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/106,821

(22) Filed: Nov. 30, 2020

(65) Prior Publication Data

US 2021/0164380 A1 Jun. 3, 2021

(30) Foreign Application Priority Data

Nov. 28, 2019 (DE) .......................... 102019218427.8

(51) Int. Cl.
*F01N 11/00* (2006.01)
*F02D 41/14* (2006.01)

(52) U.S. Cl.
CPC ........ *F01N 11/002* (2013.01); *F02D 41/1443* (2013.01); *F02D 41/1454* (2013.01); *F02D 41/1495* (2013.01); *F01N 2560/025* (2013.01)

(58) Field of Classification Search
CPC ............. F01N 11/002; F01N 2560/025; F02D 41/1443; F02D 41/1454; F02D 41/1495
See application file for complete search history.

(56) References Cited

U.S. PATENT DOCUMENTS

| | | | |
|---|---|---|---|
| 6,543,219 B1* | 4/2003 | Surnilla | F01N 3/0842 60/274 |
| 10,975,791 B1* | 4/2021 | Szczepanski | F01N 13/082 |
| 2006/0080951 A1* | 4/2006 | Pott | F01N 13/009 60/274 |
| 2009/0301060 A1* | 12/2009 | Kennie | F01N 9/005 60/285 |
| 2010/0242582 A1* | 9/2010 | Wang | F02D 41/221 73/114.62 |
| 2011/0088373 A1* | 4/2011 | Cavataio | F02B 37/007 60/284 |
| 2012/0047875 A1* | 3/2012 | Hamama | F01N 13/009 60/274 |
| 2017/0002786 A1* | 1/2017 | Glugla | F02P 11/06 |
| 2020/0318521 A1* | 10/2020 | Ravi | F02D 29/02 |
| 2021/0115824 A1* | 4/2021 | Ayesh | F01N 1/08 |

FOREIGN PATENT DOCUMENTS

DE 102005062119 A1 6/2007

* cited by examiner

Primary Examiner — Matthew T Largi
(74) Attorney, Agent, or Firm — Michael Best & Friedrich LLP

(57) ABSTRACT

A method for diagnosing a plurality of lambda sensors which are arranged upstream of an exhaust gas catalytic converter in a plurality of exhaust gas banks of a multi-flow exhaust gas system of an internal combustion engine. An opposite lambda offset of the lambda sensors is identified (54) when a difference ($\Delta T$) between a measured exhaust gas temperature ($T_{measure}$) and a modeled exhaust gas temperature ($T_{mod}$) downstream of the exhaust gas catalytic converter overshoots a threshold value (S).

7 Claims, 2 Drawing Sheets

METHOD FOR DIAGNOSING A PLURALITY OF LAMBDA SENSORS

BACKGROUND OF THE INVENTION

The present invention relates to a method for diagnosing a plurality of lambda sensors. Furthermore, the present invention relates to a computer program which executes each step of the method, and to a machine-readable storage medium which stores the computer program. Finally, the invention relates to an electronic controller which is set up to carry out the method.

When the combustion air ratio of an internal combustion engine is intended to be regulated at a value in the region of lambda=1, at least two lambda sensors are usually arranged in the exhaust gas section of the internal combustion engine. In this case, the first lambda sensor is generally a broadband lambda sensor which is arranged upstream of the first exhaust gas catalytic converter in the exhaust gas section. Said first lambda sensor serves for rapid lambda control. The second lambda sensor, which is often embodied as a step sensor, is located downstream of the exhaust gas catalytic converter. Said second lambda sensor is part of a slower, but therefore more accurate, second lambda control arrangement. If lambda deviations occur in the control loop via the first lambda sensor, these deviations can be adapted out via the second control loop. The second lambda sensor can also be used both for diagnosing lambda offset errors of the first lambda sensor and also for diagnosing the catalytic converter.

When the exhaust gas system downstream of the outlet valves of the internal combustion engine is designed as a two-flow exhaust gas system, that is to say the internal combustion engine has two exhaust gas banks, and said outlet valves open out into a single-flow exhaust gas system in front of the exhaust gas catalytic converter, this is referred to as a Y junction. Ideally, the first lambda sensor is arranged between the Y junction and the exhaust gas catalytic converter in this case. Therefore, all diagnoses can be carried out in the same way as in a single-flow exhaust gas system. For example, in motorcycles, the pipe lengths of the two exhaust gas banks in front of the Y junction are different on account of the installation space available. In this case, there is no lambda sensor arranged between the Y junction and the exhaust gas catalytic converter, but rather each exhaust gas bank has its own lambda sensor instead.

SUMMARY OF THE INVENTION

The method serves for diagnosing a plurality of lambda sensors which are arranged upstream of an exhaust gas catalytic converter in a plurality of exhaust gas banks of a multi-flow exhaust gas system of an internal combustion engine. In particular, said method serves for diagnosing two lambda sensors of a two-flow exhaust gas system, wherein the first lambda sensor is arranged in the first exhaust gas bank and the second lambda sensor is arranged in the second exhaust gas bank of the exhaust gas system. In the method, an opposite lambda offset of the lambda sensors is identified when a difference between a measured exhaust gas temperature and a modeled exhaust gas temperature downstream of the exhaust gas catalytic converter overshoots a threshold value.

In a multi-flow exhaust gas system of this kind, it is not possible to identify a lambda offset error of a lambda sensor upstream of the exhaust gas catalytic converter by means of a deviation of the lambda signal downstream of the exhaust gas catalytic converter from its setpoint value with the aid of a lambda sensor downstream of the exhaust gas catalytic converter. Specifically, a deviation of the lambda signal downstream of the exhaust gas catalytic converter can no longer be unambiguously assigned to one of the lambda sensors upstream of the exhaust gas catalytic converter. If, for example, a lambda sensor upstream of the exhaust gas catalytic converter has a positive lambda offset on one exhaust gas bank and a lambda sensor upstream of the exhaust gas catalytic converter has a negative lambda offset on another exhaust gas bank, these two errors would then be partially or completely compensated for from the perspective of the lambda sensor downstream of the catalytic converter. Increasingly lean exhaust gas constituents would occur on the exhaust gas bank with the positive lambda offset. Increasingly rich exhaust gas constituents would occur on the exhaust gas bank with the negative lambda offset. These lean and rich exhaust gas constituents would react exothermically in the exhaust gas catalytic converter which may be, in particular, a three-way catalytic converter. These exothermic reactions heat the exhaust gas catalytic converter and thereby increase the exhaust gas temperature downstream of the exhaust gas catalytic converter. Since the lambda offset cannot be detected, this heating is not taken into account in the model of the exhaust gas temperature. When there is an opposite lambda offset, the measured exhaust gas temperature is therefore higher than the modeled exhaust gas temperature. This can be utilized in order to detect the lambda offset.

The difference is preferably ascertained under stationary operating conditions of the internal combustion engine in order to prevent the diagnosis being influenced, for example, by sudden load requirements on the internal combustion engine. When the internal combustion engine drives a motor vehicle, stationary operating conditions of the internal combustion engine are present under stationary driving conditions of the motor vehicle.

If opposite lambda offsets have been identified, it is then preferred that opposite corrections of lambda setpoint values of the exhaust gas banks are performed. Opposite corrections mean, for example when there are two exhaust gas banks, that the lambda setpoint value of one exhaust gas bank is increased and the lambda setpoint value of the other exhaust gas bank is lowered. The opposite corrections are continued until a minimum for the difference between the measured exhaust gas temperature and the modeled exhaust gas temperature is reached. In order to find this minimum, it may be necessary, in particular, to carry out the opposite corrections between the exhaust gas banks alternately, so that, for example when there are two exhaust gas banks, firstly differences for situations in which the lambda setpoint value of the first exhaust gas bank is increased and the lambda setpoint value of the second exhaust gas bank is lowered are ascertained and also differences for situations in which the lambda setpoint value of the first exhaust gas bank is lowered and the lambda setpoint value of the second exhaust gas bank is increased are ascertained. When the minimum for the difference has been found, this indicates that a correction of the lambda offsets of the lambda sensors has been achieved with the corrected lambda setpoint values which are present at the minimum.

In this case, it is preferred that a conclusion is drawn about the individual lambda offsets of the lambda sensors from the corrected lambda setpoint values at the minimum. These individual lambda offsets can be stored in an electronic controller and used, for example, as an adaptation value for lambda control or as diagnosis information for diagnosing the lambda sensors.

Furthermore, it is preferred that the corrected lambda setpoint values at the minimum are maintained during further operation of the internal combustion engine. This prevents further heating of the exhaust gas catalytic converter which could damage the catalytic converter depending on duration and operating point. The situation of undesired and undetected chemical reactions in the exhaust gas catalytic converter corrupting the catalytic converter model and therefore, in the case of a three-way catalytic converter, the modeled oxygen filling level, which is used as a control variable, and therefore having a negative effect on the emissions which leave the exhaust gas system is also prevented.

The computer program is set up to carry out each step of the method, in particular when it is run on a computer or on an electronic controller. Said computer program allows different embodiments of the method to be implemented on an electronic controller, without structural modifications having to be made to said electronic controller. To this end, said computer program is stored on the machine-readable storage medium.

Loading the computer program onto a conventional electronic controller gives the electronic controller which is set up to carry out a diagnosis of a plurality of lambda sensors by means of the method.

BRIEF DESCRIPTION OF THE DRAWINGS

An exemplary embodiment of the invention is illustrated in the drawings and will be explained in greater detail in the following description.

DETAILED DESCRIPTION

Figure 1:
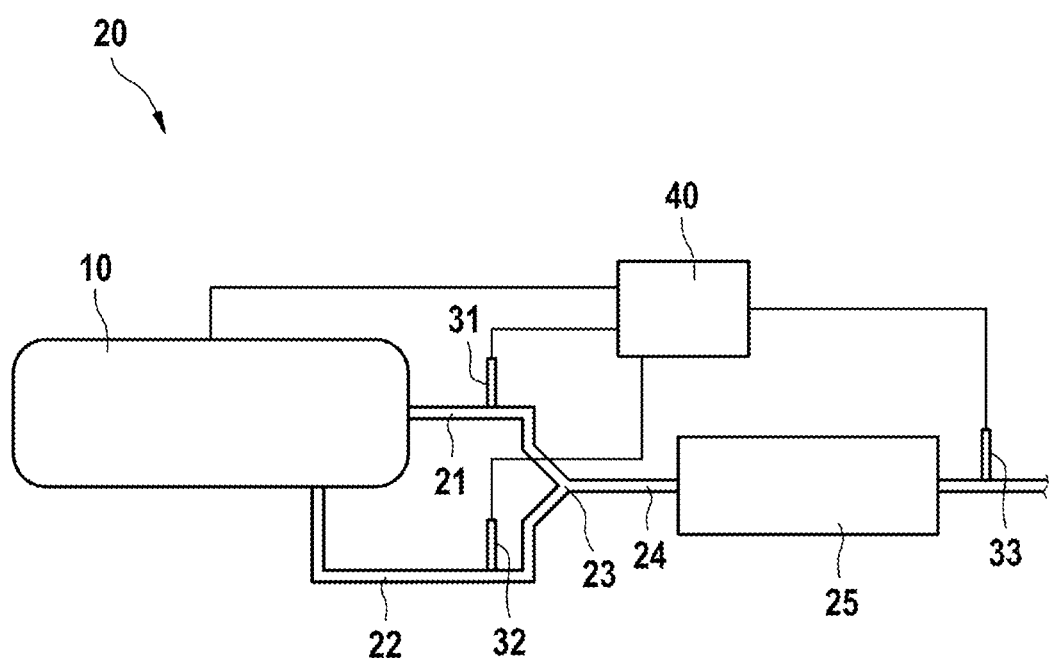
FIG. 1 schematically shows an exhaust gas system, the lambda sensors of which can be diagnosed by means of an exemplary embodiment of the method according to the invention.

An internal combustion engine 10, which drives a motorcycle in the present exemplary embodiment, is illustrated in FIG. 1. The internal combustion engine has two cylinder banks. The exhaust gas system 20 of said internal combustion engine therefore has two exhaust gas banks 21, 22. On account of the limited installation space in the motorcycle, the first exhaust gas bank 21 is shorter than the second exhaust gas bank 22. The two exhaust gas banks 21, 22 of the initially two-flow exhaust gas system 20 are combined at a Y junction 23 to form a common exhaust gas section 24. An exhaust gas catalytic converter 25, which is embodied as a three-way catalytic converter, is arranged in said exhaust gas section. A first lambda sensor 31 is arranged in the first exhaust gas bank 21. A second lambda sensor 32 is arranged in the second exhaust gas bank 22. In the present exemplary embodiment, the two lambda sensors 31, 32 are embodied as broadband lambda sensors. A temperature sensor 33 is arranged in the exhaust gas section 24 downstream of the exhaust gas catalytic converter 25. An electronic controller 40, which controls the internal combustion engine 10, receives sensor data of the two lambda sensors 31, 32 and of the temperature sensor 33.

Figure 2:
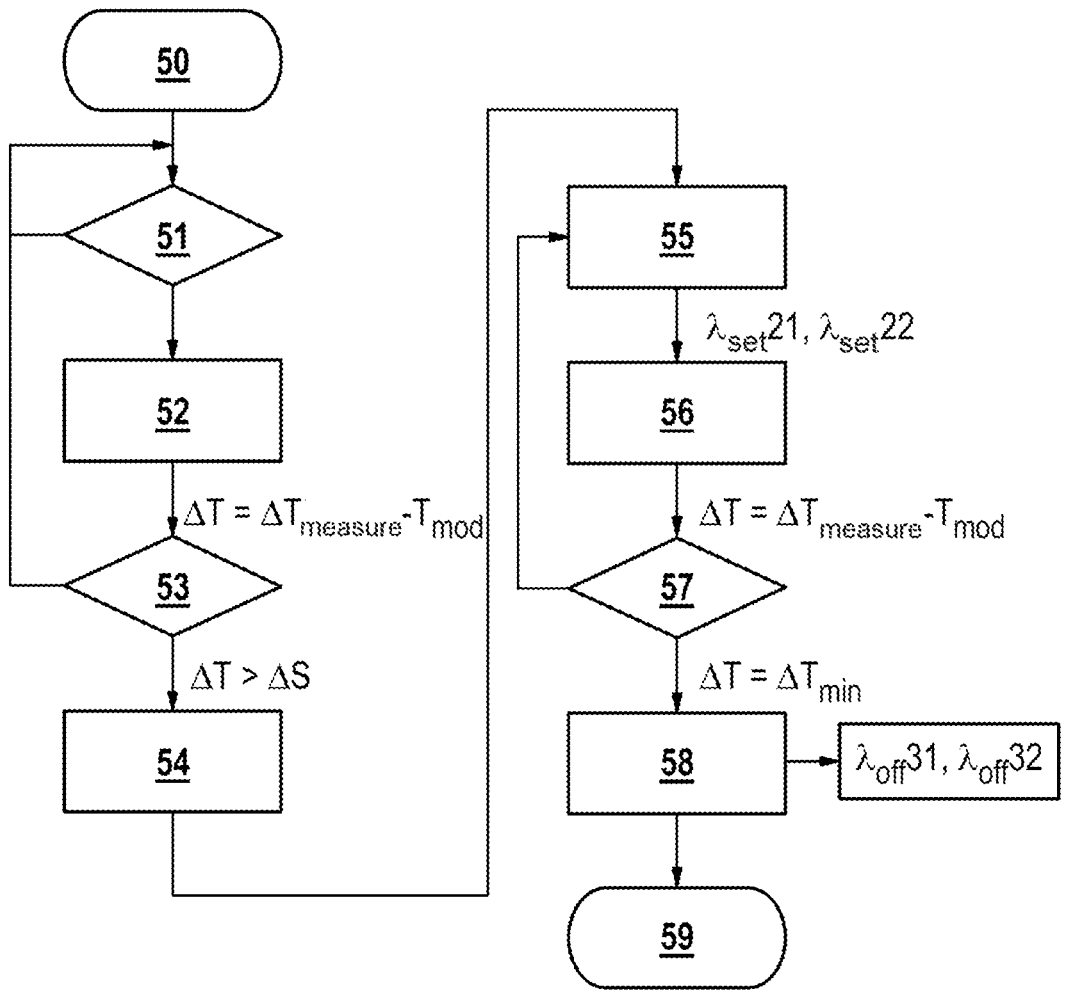
FIG. 2 shows a flowchart of an exemplary embodiment of the method according to the invention.

As is illustrated in FIG. 2, after starting 50 of an exemplary embodiment of the method according to the invention, a check 51 is initially made in respect of whether the internal combustion engine 10 is under stationary operating conditions, this being the case when the motorcycle is under stationary driving conditions. If this condition is satisfied, a difference $\Delta T$ between a measured exhaust gas temperature $T_{measure}$ and a modeled exhaust gas temperature $T_{mod}$ is calculated 52 upstream of the exhaust gas catalytic converter 25. The measured exhaust gas temperature $T_{measure}$ is measured by means of the temperature sensor 33. The modeled exhaust gas temperature $T_{mod}$ is subtracted from said measured exhaust gas temperature. Said modeled exhaust gas temperature is taken from a temperature model which does not contain any information about possible lambda offsets of the two lambda sensors 31, 32. The difference $\Delta T$ is compared with a threshold value S which is 30 Kelvins in the present exemplary embodiment. If the difference $\Delta T$ overshoots the threshold value S, it is identified 54 that there is an opposite lambda offset between the two lambda sensors 31, 32. In the text which follows, it is assumed that there is a positive lambda offset of the first lambda sensor 31 and a negative lambda offset of the second lambda sensor 32.

Opposite corrections 55 of the lambda setpoint value $\lambda_{set}21$ of the first exhaust gas bank 21 and of the lambda setpoint value $\lambda_{set}22$ of the second exhaust gas bank 22 of the internal combustion engine 10 are now performed several times. Opposite corrections are carried out here by way of one of the lambda setpoint values always being increased and the other lambda setpoint value being lowered. After each correction 55, recalculation 56 of the difference $\Delta T$ is performed in the same way as was also carried out in step 52. If a pair of corrected lambda setpoint values $\lambda_{set}21$, $\lambda_{set}22$ was found after several repetitions of the corrections 55, in which pair the difference $\Delta T$ reaches a minimum $\Delta T_{min}$ in comparison to all other corrections which were carried out, a conclusion is drawn 58 about the individual lambda offsets $\lambda_{off}31$, $\lambda_{off}32$ of the two lambda sensors 31, 32 from the corrected lambda setpoint values $\lambda_{set}21$, $\lambda_{set}22$ at the minimum $\Delta T_{min}$. When the first lambda sensor 31 has a positive lambda offset and the second lambda sensor 32 has a negative lambda offset, the lambda setpoint value $\lambda_{set}21$ of the first exhaust gas bank 21 then lies above its uncorrected value by the lambda offset $\lambda_{off}31$ of the first lambda sensor 31 at the minimum $\Delta T_{min}$. The lambda setpoint value $\lambda_{set}22$ of the second exhaust gas bank 22 then lies above the uncorrected lambda setpoint value of the second exhaust gas bank 22 by the lambda offset $\lambda_{off}32$ of the second lambda sensor 32. The method is then ended 59 and the operation of the internal combustion engine 10 is continued with the corrected lambda setpoint values $\lambda_{set}21$, $\lambda_{set}22$. In this way, there are no longer any deviations in the fuel/air mixture formation of the two exhaust gas banks of the internal combustion engine 10, so that there are also no longer any undesired increases in temperature in the exhaust gas catalytic converter 25 due to chemical reactions between rich and lean exhaust gas constituents hereinafter. Since the lambda offsets $\lambda_{off}31$, $\lambda_{off}32$ are now known, these can also be taken into account in the temperature model, so that the measured exhaust gas temperature $T_{measure}$ no longer deviates from the modeled exhaust gas temperature $T_{mod}$.

The invention claimed is:
1. A method for diagnosing a plurality of lambda sensors (31, 32) which are arranged in a plurality of exhaust gas banks (21, 22) of a multi-flow exhaust gas system (20) of an internal combustion engine (10), the plurality of exhaust gas banks (21, 22) arranged upstream of an exhaust gas catalytic converter (25), the method comprising:

modeling an exhaust gas temperature ($T_{mod}$) downstream of the exhaust gas catalytic converter (25);
measuring, via a temperature sensor, an exhaust gas temperature ($T_{measure}$);
identifying (54) an opposite lambda offset of the plurality of lambda sensors (31, 32) when a difference ($\Delta T$) between the measured exhaust gas temperature ($T_{measure}$) and the modeled exhaust gas temperature ($T_{mod}$) overshoots a threshold value (S), and
performing opposite corrections of lambda setpoint values ($\lambda_{set21}$, $\lambda_{set22}$) of the plurality of exhaust gas banks (21, 22) during the identification (54) of the opposite lambda offset.

2. The method according to claim 1, further comprising ascertaining the difference ($\Delta T$) under stationary operating conditions of the internal combustion engine (10).

3. The method according to claim 1, wherein, the opposite corrections are performed (55) until a minimum ($\Delta T_{min}$) of the difference ($\Delta T$) between the measured exhaust gas temperature ($T_{measure}$) and the modeled exhaust gas temperature ($T_{mod}$) is reached.

4. The method according to claim 3, wherein a conclusion is drawn (58) about individual lambda offsets ($\lambda_{off31}$, $\lambda_{off32}$) of the plurality of lambda sensors (31, 32) from corrected lambda setpoint values ($\lambda_{set21}$, $\lambda_{set22}$) at the minimum ($\Delta T_{min}$).

5. The method according to claim 3, further comprising maintaining corrected lambda setpoint values ($\lambda_{set21}$, $\lambda_{set22}$) at the minimum ($\Delta T_{min}$) during further operation of the internal combustion engine (10).

6. A non-transitory, computer-readable storage medium containing instructions that when executed on a computer cause the computer to control a multi-flow exhaust gas system (20) having a plurality of lambda sensors (31, 32) arranged in a plurality of exhaust gas banks (21, 22), the plurality of exhaust gas banks (21, 22) arranged upstream of an exhaust gas catalytic converter (25), the multi-flow exhaust gas system (20) being controlled to:
model an exhaust gas temperature ($T_{mod}$) downstream of the exhaust gas catalytic converter (25);
measure, via a temperature sensor, an exhaust gas temperature ($T_{measure}$);
identify (54) an opposite lambda offset of the plurality of lambda sensors (31, 32) when a difference ($\Delta T$) between the measured exhaust gas temperature ($T_{measure}$) and the modeled exhaust gas temperature ($T_{mod}$) overshoots a threshold value (S), and
perform opposite corrections of lambda setpoint values ($\lambda_{set21}$, $\lambda_{set22}$) of the plurality of exhaust gas banks (21, 22) during the identification (54) of the opposite lambda offset.

7. An electronic controller (40) for a multi-flow exhaust gas system (20) having a plurality of lambda sensors (31, 32) arranged in a plurality of exhaust gas banks (21, 22), the plurality of exhaust gas banks (21, 22) arranged upstream of an exhaust gas catalytic converter (25), the electronic controller (40) configured to:
model an exhaust gas temperature ($T_{mod}$) downstream of the exhaust gas catalytic converter (25);
measure, via a temperature sensor, an exhaust gas temperature ($T_{measure}$);
identify (54) an opposite lambda offset of the plurality of lambda sensors (31, 32) when a difference ($\Delta T$) between the measured exhaust gas temperature ($T_{measure}$) and the modeled exhaust gas temperature ($T_{mod}$) overshoots a threshold value (S)), and
perform opposite corrections of lambda setpoint values ($\lambda_{set21}$, $\lambda_{set22}$) of the plurality of exhaust gas banks (21, 22) during the identification (54) of the opposite lambda offset.

* * * * *